United States Patent Office 3,555,500
Patented Jan. 12, 1971

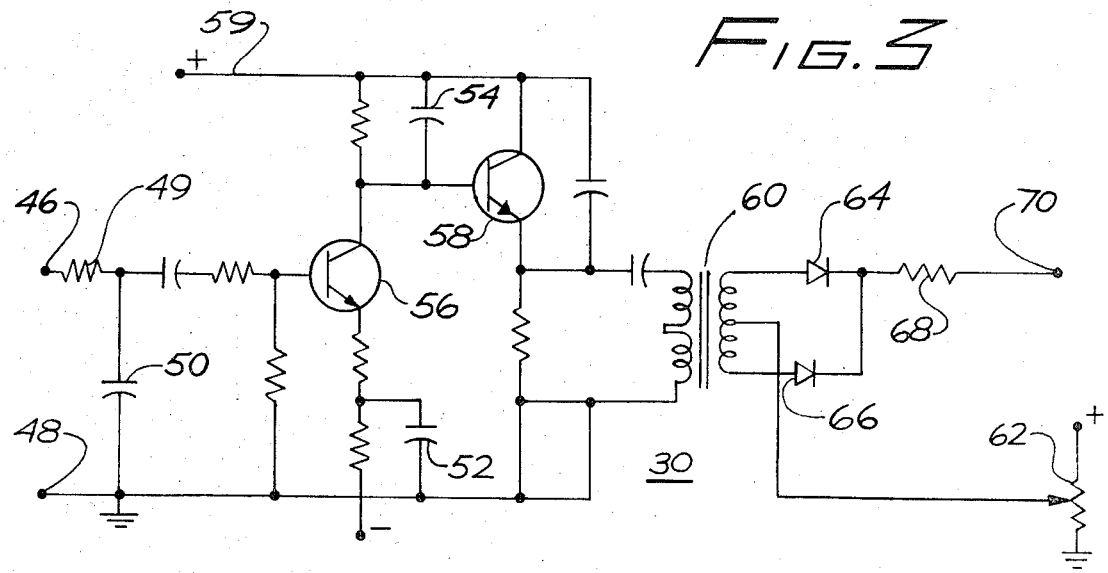
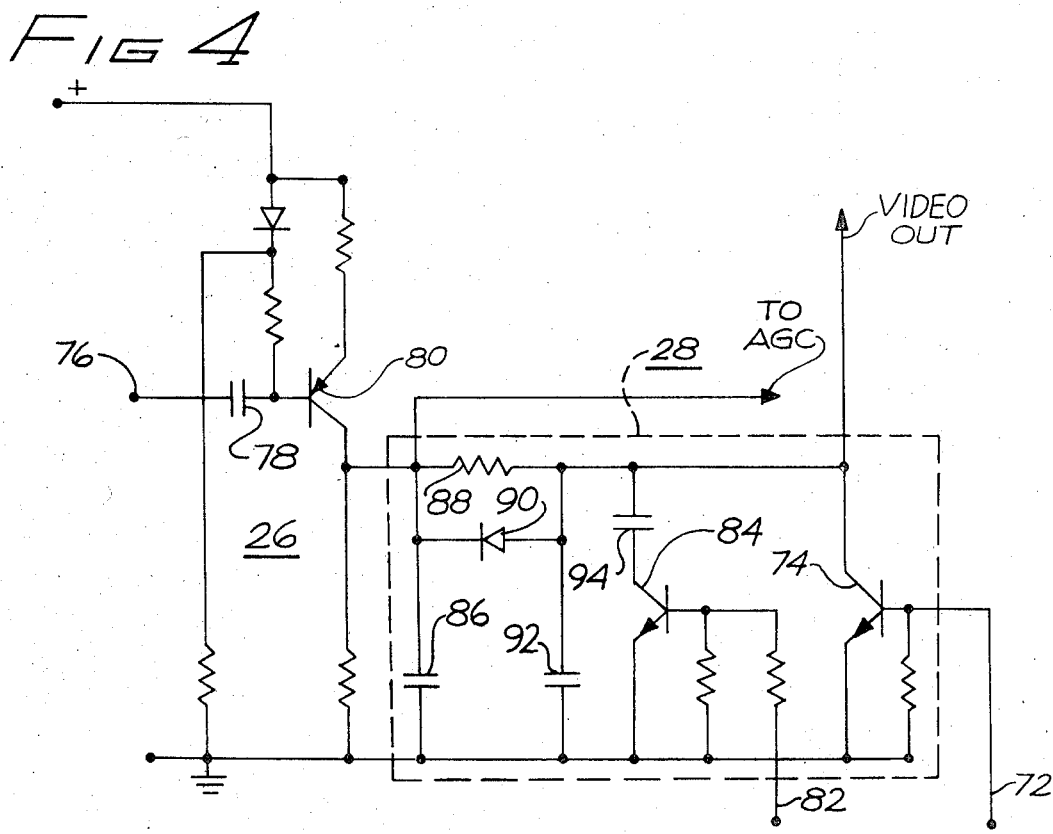

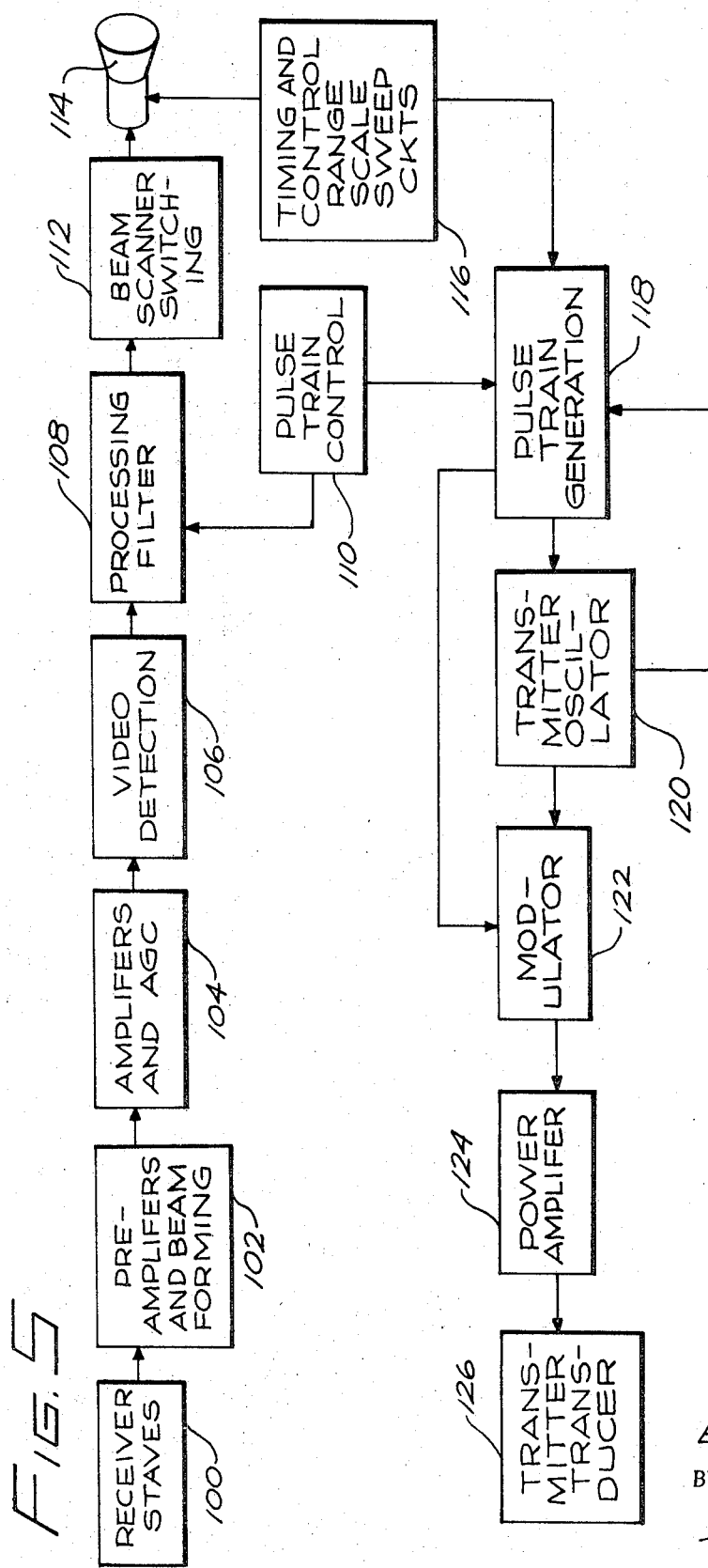

3,555,500
SONAR DETECTION SYSTEM
Ernest P. Longerich, Chatsworth, and Erland W. Rudy, Granada Hills, Calif., assignors to The Bendix Corporation, a corporation of Delaware
Filed Dec. 27, 1968, Ser. No. 787,422
Int. Cl. G01s 9/68
U.S. Cl. 340—3
16 Claims

ABSTRACT OF THE DISCLOSURE

A signal-processing system for echo-ranging sonar is described wherein a first embodiment shows the processing system with a preformed beam phase comparison type of sonar, and a second embodiment shows an essentially similar system in conjunction with a sonar of the preformed beam amplitude type. The transmitter sections of each include an oscillator for generating a high frequency signal, and means are supplied for controlling the length or duration of transmitted pulses. In addition, switching means are provided for separating normal transmit pulses into a pulse train with comparatively brief on and off times, and this switching is coordinated with post detection processing means in the receiver such that return signals of length comparable to the length of the individual pulses in the pulse train are filtered out. Longer pulses which are received because of the characteristic of reflections from larger objects to become elongated, and thus "fill in" the train, represent larger reflecting objects and are not filtered but are supplied to brighten the cathode ray tube display. The switching means is variable to adjust the length or duration of the "on" and "off" times and the number of such cycles in each train of pulses.

BACKGROUND OF THE INVENTION

This invention relates to sonar systems and, more particularly, to a system for identifying reflecting objects and for distinguishing objects having substantial size from smaller reflecting objects which may be present in the environment. A typical transmitted sonar signal consists of a pulse of significant length such as 30 to 100 milliseconds formed of a carrier frequency which may be of the order of 10 kc. Conventional frequency discrimination techniques can be used to limit the band width of the received signal which is processed, and this is effective to remove a substantial amount of noise. Because of a need to detect moving objects, however, the band width of the receiver cannot be narrowly restricted to the frequency range of the transmitted signal but must be sufficiently broad to encompass the Doppler frequency shifts from moving objects. Probably the most severe problem is that of reverberation resulting from the transmitted signal itself. Since this reverberation is from numerous reflectors or "scatterers" in the water, some moving and some stationary, the reflections echo back to the receiving transducer over a frequency band, but are heavily concentrated at the carrier frequency and frequencies closely adjacent thereto and are necessarily processed in the receiver.

An extremely narrow beam width will reduce reverberation, but scanning over a substantial area then becomes too slow. If a great many beams are used, the equipment becomes very large and cumbersome. So it is often necessary to use a beam width which is wider than one might prefer, simply to cover the area without requiring an excessive amount of equipment or unduly large transducers.

Very frequently, the problem of reverberation is so severe that a trained operator can distinguish objects of substanital size from reverberation signals only by watching the visual signal on a cathode ray tube and listening to the accompanying audio signal simultaneously, since a large reflector will tend to appear more regularly on successive sweeps than small scattering sources and, at the same time, has a different audio characteristic. Operating such a system is quite tiring, even for an experienced technician. Relatively inexperienced operators may have difficulty identifying any useful signal at all. The classification of reflecting objects has been recognized as one of the major problems in the sonar art for many years.

SUMMARY OF THE INVENTION

It has been observed that when an echo ranging pulse is transmitted, such as the 30-millisecond pulse described above, there may be a number of return pulses from miscellaneous small reflecting objects of comparable length, but returns from large reflecting objects such as ships or points of land are extended by the length of time required for the transmitted pulse to travel from the near to the far side of the object.

Since the conventional discrimination techniques deniques described above do not seem to be effective in eliminating or even substantially minimizing reverberation, it appears that the most effective way of improving sonar systems would be to transmit a pulse spectrum which in some manner influences the reverberation spectrum differently from the way it influences the target spectrum. To do this, it must be remembered that (1) the reveration spectrum is dependent upon the transmit pulse spectrum, and (2) large targets such as ships tend to elongate or stretch the transmitted pulse.

With these two points in mind, a transmit spectrum has been designed using a transmit pulse with multiple "on" and "off" times during the normal transmission period. In one arrangement, applicants used a 3.2-millisecond "on" time and a 3.2-millisecond "off" time for a period exceeding a normal 30-millisecond pulse period to produce a pulse train. Using this pulse width (3.2 milliseconds), the pulse rate frequency (PRF) for a 10 kc. carrier is 156 Hz. Were this an infinite pulse train, line spectra would appear which contain the energy transmitted, separated by the PRF frequency; i.e., a line spectrum at $f_0$ (the center of the receiving band width), another at $f_0+$PRF, another at $f_0+2$ PRF, and also one at $f_0-$PRF and another at $f_0-2$ PRF, etc. Depending upon the particular pulse train employed and the receiver band width, the amount of energy returned within the band width of the sonar system can be controlled. A particular advantage of the system described herein is that the transmitted energy is concentrated at controlled frequencies other than the center frequency ($f_0$) but within the receiver pass band such as $f_0+$PRF.

Where the above-described on and off transmission is reflected from a large object such as a ship, the target will normally stretch the return by an amount greater than 3.2 msec. Normally this much stretching will occur if the equivalent sonar length of the object is seven and one-half feet or more. If the return is stretched by 3.2 msec., the off time is filled by the extended return, and the return pulse resembles a normal extended rectangular transmitted return. Returns from smaller objects will not fill in and will be of duration comparable to the individual transmitted pulses. Thus the reverberation signal may be reduced by the sonar band width and by post-detection processing. The difference in processing provides a net improvement in signal-to-reverberation ratio at the output.

Control can be exhibited over the types of returns to be processed by varying the off time of the pulse train. As an example, for the 3.2 msec. off time the target must produce an extension of seven and one-half feet in sonar length. If the off time were increased to 6.4 msec., the target would have to be the equivalent of fifteen feet. By varying the off time, therefore, it is possible to predetermine the effective sonar length of the object which will fill in the pulse train and produce a good return in the sonar system. Thus ships, for example, can be separated from the normal volume reverberation caused by marine life. Further, this technique may be used to actually measure the equivalent sonar length of the reflecting object by varying the off time and determining the specific width or period of off time at which the return pulse just begins to fill in to form a continuous pulse. Similarly, the same technique may be used for shorter ranges where much shorter transmit pulses are used, such as 1-millisecond pulse used for mine detection which can be broken into a chain of 0.1-millisecond pulses separated by 0.1-millisecond intervals.

Another advantage of the pulse train technique described herein is in the control provided of the frequency of amplitude undulations caused by vector addition of signals from many reflectors simultaneously. These undulations obscure the real target and are normally of the same frequency as the target ($f_0$). By variation of the parameters, the pulse train can be modified to control the spectrum of the transmission so that the undulations produced by the vector addition can be concentrated at a frequency sufficiently removed from the frequency of the undulation of the target that they may be removed by filtering.

DESCRIPTION OF THE DRAWING

FIG. 3 is a schematic drawing showing details of the bearing coherence circuit shown in block diagram in FIG. 1.

FIG. 4 is a schematic drawing showing details of the video detector and processing filter circuits shown in FIG. 1.

FIG. 5 is a block diagram of a sonar system of the pre-formed beam amplitude type incorporating our discrimination system.

DESCRIPTION OF PREFERRED EMBODIMENTS

Figure 1:
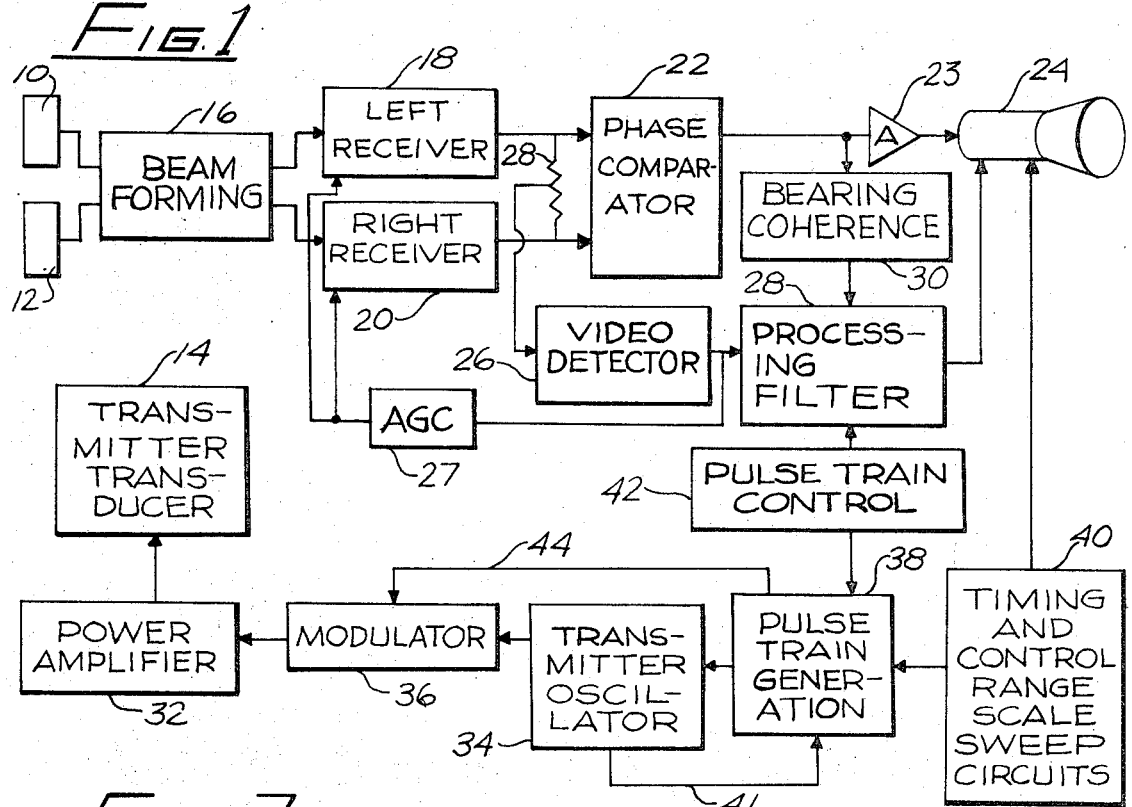
FIG. 1 is a block diagram showing our discrimination system incorporated into a sonar system of the preformed beam phase comparison type.

Referring now to FIG. 1, a pair of receiver hydrophone elements or "staves" are shown at numerals 10 and 12. These sets of staves receive the reflected sonar signals, and their spatial position is so arranged that the signal delay therebetween produces a phase shift between the two outputs that is a function of the angle of arrival. As is well understood in the art, this phase angle is used to obtain a higher bearing resolution than is obtainable with a single beam of the same width. A typical sonar will include separate means for processing signals received from each of several sectors to scan a large area, but such means are not a necessary part of the present description. A typical system showing bearing deviation indicator processing and means for receiving and combining signals over a number of separate sectors is described in copending application Ser. No. 577,227 filed in the name of Erland Rudy and assigned to the assignee of the present application.

The sonar signals received at staves 10 and 12 are processed in beam-forming circuits 16 whose function, as is well known in the art, is to combine the input signals from several such staves represented by staves 10 and 12 to form two discrete electrical signals representative of the right and left beams which are received somewhat displaced in space from each other.

The discrete left and right signals are then processed in separate receiver channels 18 and 20 which typically include local oscillator, mixer and intermediate frequency amplifier stages which are well understood in the art. The separate left and right amplifiers will also include filters which discriminate against the carrier frequency ($f_0$) because of the amplitude undulations referred to above, while permitting adjacent side bands to be transmitted. The phase comparator output will be a series of positive and negative pulses which are processed in phase comparator 22 which may include limiters for each channel and a multivibrator circuit which receives the limited receiver pulses and produces positive and negative square waves which are symmetrical if there is no phase difference between the left and right receiver outputs and relatively longer or shorter pulses of one polarity or the other to indicate magnitude and direction of phase differences between the right and left signals. The output of the phase comparator 22 is amplified in a conventional deflection amplifier 23 and is then supplied to the display device 24 (which in this instance is a cathode ray tube) in such manner that the position of the reflecting object is indicated as a bright spot at a distance left or right of the center of the sector which is being scanned. Distance from the receiver is typically indicated by the distance from the center of the cathode ray tube 24 whose sweep circuits are timed to begin with the transmitted pulse. Some typical receiver phase comparator sweep circuits and sector combining arrangements are described in greater detail in the copending application, Ser. No. 577,227, referred to above.

Also connected to receive the output phase from the left and right signal receivers 18 and 20 is a video detector circuit 26 connected to the center tap of a resistor 28 which is connected between the output terminals of the receivers. This circuit serves as an amplifier and detector for the return pulse signal which is then delivered to an automatic gain control circuit 27 which feeds back into receivers 18 and 20 and to a processing filter 28 before being supplied as a video pulse to the cathode ray tube 24. The output signal from the phase comparator 22 is also connected to a bearing coherence circuit 30 which supplies an input to the processing filter 28. It is the function of the bearing coherence and processing filter circuits to eliminate a substantial amount of noise from the return signal. The phase comparator output typically contains a substantial amount of high frequency component caused by reverberation and a substantial number of small reflectors, but a signal return from an object of substantial size will cause the signal to develop a significant direct current component for a substantially longer period of time, indicating substantial reflected energy. By means of a high pass filter in circuit 28, the high frequency component of the signal is separated and used to gate a transistor switch in the processing filter 28 which causes the high frequency component in the video detector output to be grounded, leaving only the coherent signals to be supplied to the cathode ray tube 24. These circuits are described in greater detail below.

The transmitter components are shown in the lower row of blocks and include the transmitter transducer 14 driven by the power amplifier 32. This amplifier receives a high frequency signal generated by an oscillator 34, and this oscillator output, which may be of the order of 10 kH$_z$., may be modulated by means of a modulator 36. Supplied to the oscillator 34 is an output signal from a pulse train generator circuit 38 which preferably includes digital counting means and which receives a setting from timing and control means 40 which may include simple manual switches to control the length of 10 kH$_z$. pulses produced by the oscillator and the timing of the sweep circuits in conjunction, since a new sweep cycle should begin with each transmitted pulse. It is quite common for sonar systems to have the capacity to transmit pulses of varying length, since both short and long pulses have advantages for particular applications. Typical pulse length values are 3 msec. and 30 msec. Shorter pulses are less susceptible to loss of resolution for shorter distances, and longer pulses obviously carry more energy for satisfactory returns from greater distances.

A feedback signal from oscillator 34 is connected back to the pulse train generation means 38 through a wire 41. This feedback signal provides oscillator phase information so that the pulse train generator will always start and stop the pulses at a zero crossing of the oscillator to avoid high transient currents which might damage the power amplifier 32. These techniques are well known in the art and are used in commercially available signal generators.

Also connected to the pulse train generator 38 is a pulse train control 42 which may include a plurality of manually operated switches for setting pulse length and the time between pulses of generator 38 and which co-ordinates a setting on the pulse train generation means with a filter setting in the processing filter 28 to control the length of the video signal processed in the receiver. The pulse train generator is connected through a wire 44 to the modulator 36 to control the on and off times of the transmitted pulses. Thus the pulse train generation means 38 may be set by control 40 to produce a nominal 30-msec. pulse of 10 kHz. signal, but this may be further modulated as set by the control 42 to break up the transmitted pulse into a train of a given number of 3-msec. pulses with 3 msec. off time. Alternatively, the "on time" may be varied as may the "off time," or both may be changed simultaneously. Since, as set forth above, the tendency of large reflecting objects is to cause an extension of the return signal which is approximately related to the "sonar equivalent length" of the reflecting object, it follows that by progressively shortening the "off time" until the extensions just begin to fill in or until the transmitted chain just begins to appear like a continuous return at the receiver, an operator may make an approximation of the sonar equivalent length of the reflecting object. This would be done by varying the output of pulse train generation means 38 through the pulse train control 40.

Figure 2:
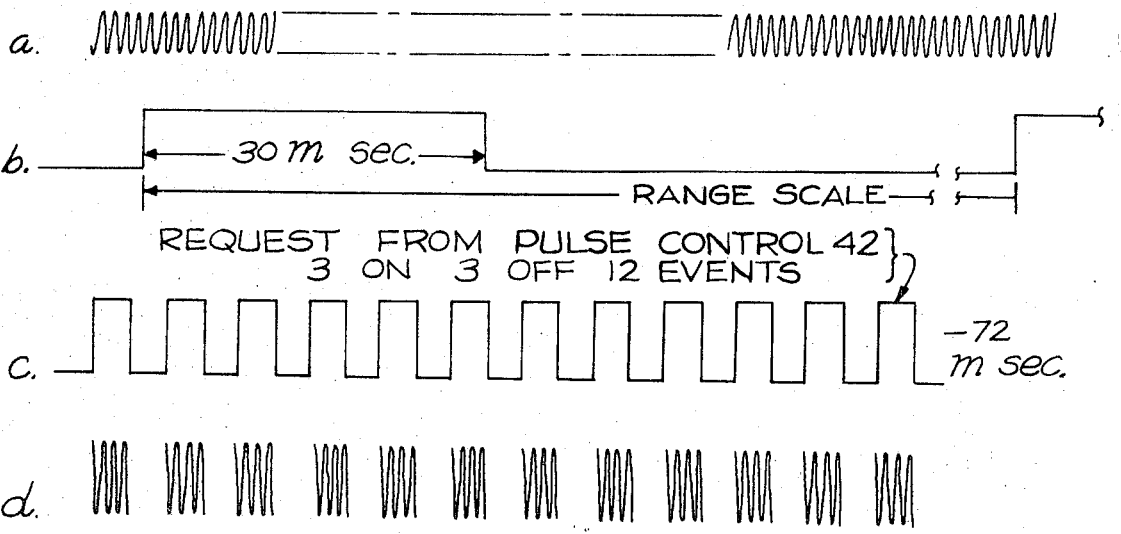
FIG. 2 is a series of graphs showing the manner in which the transmitted signal is processed by the system of FIG. 1.

This operation may be better understood from a consideration of the several time-signal charts shown on FIG. 2. Graph *a* shows a representation of the continuous high frequency oscillator output from oscillator 34. The timing and control circuits produce an output seen on graph *b* as a series of pulses of substantial length (30 msec.) which are supplied to the pulse train generation circuits 38 to cause the modulator 36 to pass the oscillator signal for only that part of the range scale corresponding to the length of the pulses from circuit 40. The pulse train control 42 may, however, request a train of pulses such as 12 events of 3 msec. on and 3 msec. off, as shown in graph *c,* which may exceed the total length of the pulse from circuit 40, in which case the control 42 assumes the control of the output of the pulse train generation means 38 for a longer period. These pulses are used to modulate the oscillator output as shown in graph *d,* in which case the transmitter will transmit for a substantially longer period than requested on timing and control circuits 40. To prevent this extension from being fed into the receiver, special blanking circuits prevent processing in the receiver until the transmission chain has been completed.

Details of the bearing coherence circuit 30 are shown in schematic diagram in FIG. 3. The phase comparator output is connected between a terminal 46 and a ground line 48. The signal appearing at terminal 46 is filtered by means of a resistor 49 and a capacitor 50 such that high frequency signals are fed to ground, which removes the intermediate frequency carrier components from the signal.

Additional filtering is provided by capacitors 52 and 54, thus providing a high pass filter characteristic which passes the high frequency components most representative of reverberation and reflections from miscellaneous point scatterers widely separated in space. These components are amplified by means of amplifier stages represented by transistors 56 and 58 supplied from a direct current voltage source at terminal 59 and, as amplified, are supplied to a transformer 60 which has a center-tapped secondary winding with the center tap connected to a threshold or sensitivity adjustment provided by a potentiometer 62. The opposite ends of the secondary winding are connected through diodes 64 and 66 through a resistor 68 to the output terminal 70 which is connected to a conductor or wire 72 in the input to the processing filter 28 shown on FIG. 4. The secondary winding of transformer 60 and diodes 64 and 66 provide full wave rectification for the high frequency components of the input signals, and these are supplied through wire 72 to the base of a transistor 74 in the processing filter 28. Transistor 74 acts as a switch such that when it conducts, high frequency components of the detected signal appearing at its collector are connected to ground. The sensitivity adjustment provided by potentiometer 62, by controlling the threshold of the switching potential applied to the base of transistor 74, effectively provides a means for adjusting the sensitivity of the receiver to certain high frequency input signals. It may be set to ground only certain very short signals, or it may ground all but signals having substantial duration, depending upon the range, hence the length or duration of the transmitted signal among other things.

The circuit shown in FIG. 4 includes the video detector 26 and the processing filter 28. The input appearing between terminal 76 and the ground line is the sum signal from the receivers 18 and 20 taken from the center tap of resistor 28. This signal, which has not been limited and which may include both the desired return signal and reverberation, is supplied through a coupling capacitor 78 to a transistor 80 which acts as a half wave detector. The detected signal is then supplied to the automatic gain control 27, which may be any of several known circuit arrangements, and the processing filter circuit 28 which, in addition to the input from circuit 30, also receives an input from pulse train control 42 through a wire 82 which is connected to the base of a transistor 84. This transistor acts as a switch to control the time constant of the filter to coordinate the video signals with the transmitted signal as requested on the pulse train control 42. Since the detected signal at this point contains the intermediate frequency carrier component, this is filtered through a capacitor 86; but the filtered signal is subjected to further processing by means of a filter consisting of a resistor 88, a diode 90, capacitors 92 and 94, and transistor 84. The transistor 84, which is biased to conduction from pulse train control 42, acts as a switch to either permit the detected signal to build up on capacitor 92 (when 84 is not conducting) or capacitor 94 when 84 is conducting, thus providing a means of controlling the filter time constant by either adding the capacitive effect of capacitor 94 to that of capacitor 92 or effectively removing capacitor 94 from the filter. While only two time-constant arrangements are shown, additional similar switches may be used to add or remove further capacitance, as required, to control the time period allotted for the detected signal to build up in filter 28. This time is, of course, coordinated with the transmit pulse.

As indicated above in the description of the transmitter, the transmitted signals may consist of short pulses such as 3 msec. or longer pulses such as 30 msec. If operating to produce a series of closely spaced pulses, the entire pulse train may be significantly longer than requested by control 40. When a series of closely spaced pulses is transmitted, these are returned as a series of closely spaced pulses unless the reflecting object is of such size as to cause the spaces to fill in. When short pulses are returned, it has been found that the conventional R-C filter consisting of resistor 88 and capacitors 92 and 94 operates to permit the voltage to build up on the capacitors. Thus it does not decay entirely between pulses. This effect is not desired since it makes the signal appear like that from a large reflector; the diode 90 is included to "dump" or conduct such short pulse signals to ground more rapidly. With a received pulse which does not return to zero over a significant period, the signal continues to build to higher values on the capacitors despite diode 90. The diode only discharges the capacitor when the input voltage is lower than the charge on the capacitor and only by the amount of the difference.

The input at wire 72 is the high frequency signal from the bearing coherence circuit 30 which includes received signals representative of reverberation, small scattered reflectors and phase cancellation fluctuations, etc. It is not desired to display such signals, so this input is supplied to the base of transistor 74 to cause said transistor to conduct the detected signal to ground at the identical instant such high frequency components appear. Thus the brightness signal supplied to the cathode ray tube contains only the pulses of significant length representing objects of substantial size.

In FIG. 5 our signal-processing system is shown in conjunction with a preformed beam amplitude type of sonar system. This system uses a plurality of very narrow beams which becomes possible when a very large transducer using a large number of elements or staves is used. Many of the parts are identical, or may be identical, with those shown in FIG. 1. Again, the description is of a single channel, and it will be recognized that a number of identical receiver channels would be used with conventional switching means to repeatedly scan the receiver outputs to provide a complete 360° display.

The reflected signals are received at the receiver staves 100 where they are converted from acoustic to electrical signals and supplied to the pre-amplifier and beam-forming circuits 102. Although a signal may actually be received at a plurality of adjacent staves, the beam-forming circuits operate in a manner well known in the art to produce a single beam. These signals are amplified in conventional automatic gain control amplifiers 104, detected in video detector circuits 106, and are then fed to a processing filter 108. Processing filter 108 includes an input from a pulse train control means 110 which may be essentially the same as that in FIG. 1. Filter 108 may be very similar to filter 28 except that filter 108 does not include an input to a transistor switch from a bearing coherence circuit since this system operates primarily on amplitude information rather than bearing information. It does, of course, include the switch for controlling the time constant of the video signal. The output of the processing filter 108 is supplied to a beam scanner switching means 112, which may be of conventional design, and from thence to a cathode ray tube 114. The beam scanner switching means 112 may provide receiver signals from a large number, such as 36 or 48, separate beam-amplification circuits.

In the transmitter, the chain of components is, or may be, essentially identical with the device of FIG. 1. The timing and control circuits 116 request transmit pulses of a desired length and coordinate the cathode ray sweep circuits so that there will be one sweep per transmit pulse or, in this case, transmit pulse train. This request, which also may appear like graph b of FIG. 2, is supplied to the pulse train generation circuit 118 which supplies this signal to the transmitter oscillator 120 and to the modulator 122 which gates the oscillator output as requested to provide long or short pulses at the oscillator frequency. The control 110, in addition to providing a signal to the processing filter 108 to coordinate the filter time constant with the length or duration of the transmitted pulse, provides a means for varying the "on" and "off" time of the transmitted pulse. Thus the desired pulse train may be requested, and the "off" time may be varied to provide an approximation of the "sonar equivalent length" of the reflecting object, as set forth above. To the extent that the pulse train exceeds the pulse length by the timing and control circuit 116, the receiver receives blanking signals to prevent its processing of the transmit pulse directly.

From the foregoing, it will be appreciated that applicants have provided a very useful means of discriminating between signals representative of substantial size and those of smaller size which represent reverberation, small fish, etc. By converting a pulse of substantial length into a pulse train with short intervals of no transmission, the small targets are caused to return only short pulses roughly corresponding to the length of the individual transmitted pulses. Yet the energy delivered into the water is comparable to that of the single uninterrupted pulse, and large targets return a reflected signal which appears like that from an uninterrupted pulse because of the tendency of large objects to fill in or elongate the transmitted pulse. It thus becomes a relatively straightforward process to filter out the short pulse returns from the longer returns, and this has been found to produce a substantial improvement in the sonar display.

We claim:

1. In a sonar system including a receiving transducer and a receiving system, a transmitting transducer and a transmitter for driving said transmitting transducer including means for generating a signal to be transmitted and control means for producing echo-ranging pulses by controlling the time of transmission of said signal and the intervals between said times;

signal generation and processing means associated with said control means including modulation means for producing pulse trains to be transmitted consisting of a series of short pulses of said signal where the duration of said short pulses and the interval between said short pulses in said trains is substantially shorter than the echo ranging interval between pulse trains;

and means in said receiving system for filtering out received signals of duration comparable to the duration of said short pulses while permitting received signals of greater duration to pass to the output of said receiving system.

2. Signal generation and processing means for a sonar system as set forth in claim 1 wherein said modulation means includes switching means for variably selecting the duration of said short pulses or the duration of said interval between said short pulses.

3. In a sonar system of the echo ranging type including a display system, a receiving transducer and a receiving system having a pass band connected to said display system, a transmitting transducer and a transmitter for driving said transmitting transducer including means for generating a high frequency carrier signal to be transmitted and control means for producing echo ranging pulses by controlling the time of transmission of said signal and the intervals between said times;

signal generation and processing means associated with said control means including modulation means for superimposing a modulation signal on said carrier signal pulses such that the transmitted energy is caused to be concentrated at said carrier frequency and at side bands thereof, filtering means in said receiving system for discriminating against said carrier frequency and detection means in said receiving system for detecting amplitude information on said modulation signal and for supplying said amplitude information to said display means.

4. Signal generation and processing means for a sonar system as set forth in claim 3 wherein said receiving system includes beam-forming circuits producing signals representative of a pair of overlapping phase center displaced beams, separate receiver channels for each of said beam-forming circuit signals, and said discrimination means includes filtering means in said receiver channels.

5. In a sonar system including a receiver having a receiving transducer, a receiving system including a detector, post detection processing means, and display means;
- and a transmitter with a transmitting transducer, a power amplifier for driving said transducer, an oscillator for generating and supplying a high frequency signal to said power amplifier, and control means for controlling the transmission period of the oscillator output signal and the intervals between said periods to produce echo ranging pulses;
- signal generation and processing means comprising means associated with said control means for modulating said echo ranging pulses to produce pulse trains to be transmitted consisting of a series of short pulses of said oscillator signal interspersed with periods of no transmission;
- and means forming part of said post detection processing means for effectively filtering out received signals of duration comparable to the duration of said short pulses while permitting received signals of greater duration to reach said display means.

6. A sonar system as set forth in claim 5 wherein said post detection processing means includes first capacitance means and a resistor for controlling the time constant of the received signal, second capacitance means connected in parallel with said first capacitance means, and switching means responsive to said control means for controlling conduction between said second capacitance means and ground to vary the effective time constant of said filtering means.

7. A sonar system as set forth in claim 5 wherein said receiving system includes beam-forming circuits producing signals representative of a pair of overlapping phase center-displaced beams, separate receiver channels for each of said signals, and phase comparator means for receiving the outputs of said receiver and for producing an output to said display means.

8. A sonar system as set forth in claim 6 wherein said receiving system includes beam-forming circuits producing signals representative of a pair of overlapping phase center-displaced beams, separate receiver channels for each of said signals, and phase comparator means for receiving the outputs of said receiver and for producing an output to said display means.

9. A sonar system as set forth in claim 7 wherein the output of said phase comparator is supplied to a high pass filter, a switching transistor is connected in said post detection processing means such that when said transistor is conducting the received signal is connected to ground, and means connecting the output of said high pass filter to control said switching transistor.

10. A sonar system as set forth in claim 8 wherein the output of said phase comparator is supplied to a high pass filter, a switching transistor is connected in said post detection processing means such that when said transistor is conducting the received signal is connected to ground, and means connecting the output of said high pass filter to control said switching transistor.

11. A sonar system as set forth in claim 6 wherein a diode is connected in the circuit with said resistor and said first capacitance means such that short pulse signals which tend to build up on said first capacitance means are conducted to ground in the interval between said short pulses.

12. For use with a sonar system having a receiving transducer, a receiving system, a detector, post detection processing means and display means;
- and a transmitter having a transmitting transducer, a power amplifier, an oscillator for generating and supplying a high frequency signal to said power amplifier, and control means for controlling the transmission periods and the interval between transmission periods of the oscillator output signal to produce echo ranging pulses;
- signal processing means comprising switching means associated with said control means for variably selecting pulse trains to be transmitted consisting of a series of short pulses of said oscillator signal interspersed with short periods of no transmission and means forming part of said post detection processing means for filtering out received signals of duration comparable to the duration of said short pulses while permitting received signals of greater duration to reach said display means.

13. A signal-processing means for a sonar system as set forth in claim 12 wherein said switching means includes modulator means connected between said oscillator and said power amplifier to modulate said echo ranging pulses.

14. A signal-processing means for a sonar system as set forth in claim 13 wherein feedback means are connected from said oscillator to said switching means to control said switching means to gate said modulator off and on only when the instantaneous output of said oscillator is substantially at zero level.

15. A signal-processing means for a sonar system as set forth in claim 12 wherein adjustable means are provided in association with said switching means for variably changing the duration of said short periods of no transmission and/or said short pulses to determine the point at which said receiver just begins to receive elongated pulses rather than short pulses from reflecting objects.

16. A signal-processing means for a sonar system as set forth in claim 12 wherein said receiving system includes beam-forming circuits producing signals representative of a pair of overlapping phase center-displaced beams, separate receiver channels for each of said signals, and phase comparator means for receiving the outputs of said receivers and for producing an output to said display means.

References Cited

UNITED STATES PATENTS

| | | | |
|---|---|---|---|
| 3,024,441 | 3/1962 | Saxton | 340—3X |
| 3,174,127 | 3/1965 | Haslett | 340—3 |
| 3,257,638 | 6/1966 | Kritz et al. | 340—3 |

RICHARD A. FARLEY, Primary Examiner

U.S. Cl. X.R.

340—6